United States Patent
Bajpay et al.

(10) Patent No.: US 9,118,544 B2
(45) Date of Patent: *Aug. 25, 2015

(54) METHOD AND APPARATUS FOR PROVIDING AUTOMATED PROCESSING OF A SWITCHED VOICE SERVICE ALARM

(71) Applicant: AT&T Intellectual Property I, L.P., Atlanta, GA (US)

(72) Inventors: Paritosh Bajpay, Edison, NJ (US); Roberta Bienfait, Norcross, GA (US); Mojgan Dardashti, Holmdel, NJ (US); Jackson Liu, Middletown, NJ (US); Timothy Plattner, Westfield, NJ (US); Zhiqiang Qian, Holmdel, NJ (US); Michael Zinnikas, North Brunswick, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 313 days.

This patent is subject to a terminal disclaimer.

(21) Appl. No.: 13/708,536

(22) Filed: Dec. 7, 2012

(65) Prior Publication Data

US 2013/0176863 A1 Jul. 11, 2013

Related U.S. Application Data

(63) Continuation of application No. 12/175,174, filed on Jul. 17, 2008, now Pat. No. 8,363,790.

(51) Int. Cl.
*H04L 12/24* (2006.01)
*H04L 12/66* (2006.01)

(52) U.S. Cl.
CPC ............ *H04L 41/0613* (2013.01); *H04L 12/66* (2013.01)

(58) Field of Classification Search
None
See application file for complete search history.

(56) References Cited

U.S. PATENT DOCUMENTS

| | | |
|---|---|---|
| 3,626,383 A | 12/1971 | Oswald et al. |
| 3,653,041 A | 3/1972 | McGrath et al. |
| 3,839,707 A | 10/1974 | Woodward et al. |
| 3,937,935 A | 2/1976 | Le Pabic |
| 4,096,354 A | 6/1978 | Bleickardt et al. |
| 4,112,488 A | 9/1978 | Smith, III |
| 4,233,471 A | 11/1980 | Butcher et al. |
| 4,273,955 A | 6/1981 | Armstrong |
| 4,513,411 A | 4/1985 | Fraser |
| 4,704,714 A | 11/1987 | Timizawa et al. |
| 4,972,453 A | 11/1990 | Daniel et al. |
| 5,237,677 A | 8/1993 | Hirosawa et al. |
| 5,280,515 A | 1/1994 | Nagatsu |
| 5,548,720 A | 8/1996 | Fujii |
| 5,953,389 A | 9/1999 | Pruett et al. |
| 6,163,594 A | 12/2000 | Kennedy et al. |
| 6,345,257 B1 | 2/2002 | Jarrett |
| 6,381,644 B2 | 4/2002 | Munguia et al. |
| 6,449,341 B1 | 9/2002 | Adams et al. |

(Continued)

*Primary Examiner* — Kevin C Harper
*Assistant Examiner* — Derrick V Rose

(57) ABSTRACT

A method and apparatus for providing automated processing of a switched voice alarm on a switched and/or Internet Protocol (IP) network are disclosed. For example, the method receives an alarm associated with a switched voice service, and retrieves a Local Routing Number (LRN) or Primary Inter-exchange Carrier (PIC) information from a switch serving a call associated with a caller's telephone number. The method determines if the alarm is due to one or more service degradations, and notifies a work center responsible for one or more of the service degradations if the alarm is due to the one or more service degradations.

20 Claims, 6 Drawing Sheets

(56) References Cited

U.S. PATENT DOCUMENTS

| | | |
|---|---|---|
| 6,467,055 B1 | 10/2002 | Katuszonek |
| 6,687,335 B1 | 2/2004 | Jones et al. |
| 6,690,785 B1 | 2/2004 | Stelter et al. |
| 6,714,979 B1 | 3/2004 | Brandt et al. |
| 6,763,333 B2 | 7/2004 | Jones et al. |
| 6,804,335 B1 | 10/2004 | Kugell |
| 6,859,783 B2 | 2/2005 | Cogger et al. |
| 6,931,102 B2 | 8/2005 | Onweller et al. |
| 7,058,600 B1 | 6/2006 | Combar et al. |
| 7,130,399 B1 * | 10/2006 | Jean et al. .................... 379/126 |
| 7,139,369 B2 | 11/2006 | Martin et al. |
| 7,231,415 B1 | 6/2007 | Eslambolchi et al. |
| 7,257,205 B2 | 8/2007 | Forte |
| 7,275,053 B1 | 9/2007 | Gardner et al. |
| 7,426,654 B2 | 9/2008 | Adams et al. |
| 7,471,194 B2 | 12/2008 | Itou |
| 7,525,422 B2 | 4/2009 | Bishop et al. |
| 7,543,328 B2 | 6/2009 | Bialk et al. |
| 7,664,233 B1 | 2/2010 | Kirchmeier et al. |
| 7,688,951 B1 | 3/2010 | Bajpay et al. |
| 7,802,287 B2 | 9/2010 | Bialk et al. |
| 7,818,283 B1 | 10/2010 | Bajpay et al. |
| 8,306,200 B2 | 11/2012 | Bajpay et al. |
| 8,363,790 B2 | 1/2013 | Bajpay et al. |
| 8,467,518 B2 | 6/2013 | Blair |
| 8,503,642 B2 | 8/2013 | Johnson |
| 2002/0111139 A1 | 8/2002 | Nishiyama et al. |
| 2002/0161667 A1 | 10/2002 | Felkey et al. |
| 2004/0060073 A1 | 3/2004 | Bialk et al. |
| 2004/0202302 A1 | 10/2004 | Richards |
| 2004/0258227 A1 | 12/2004 | Hanna et al. |
| 2005/0240315 A1 | 10/2005 | Booth et al. |
| 2006/0095510 A1 | 5/2006 | Rouse et al. |
| 2006/0233311 A1 | 10/2006 | Adams et al. |
| 2006/0244585 A1 | 11/2006 | Bishop et al. |
| 2006/0248407 A1 | 11/2006 | Adams et al. |
| 2007/0013508 A1 | 1/2007 | Itou |
| 2007/0064594 A1 | 3/2007 | Norton |
| 2007/0217437 A1 | 9/2007 | Forte |
| 2007/0283012 A1 | 12/2007 | Chu et al. |
| 2008/0013531 A1 * | 1/2008 | Elliott et al. .................... 370/356 |
| 2008/0025295 A1 | 1/2008 | Elliot et al. |
| 2008/0037742 A1 | 2/2008 | Greenberg |
| 2008/0226044 A1 | 9/2008 | Johnson |
| 2008/0253362 A1 | 10/2008 | Samarasinghe et al. |
| 2008/0298229 A1 | 12/2008 | Ballantyne et al. |
| 2009/0310604 A1 | 12/2009 | Alturi et al. |
| 2010/0014431 A1 | 1/2010 | Bajpay et al. |
| 2010/0014644 A1 | 1/2010 | Bajpay et al. |
| 2010/0014651 A1 | 1/2010 | Bajpay et al. |
| 2013/0010932 A1 | 1/2013 | Bajpay et al. |
| 2013/0176863 A1 | 7/2013 | Bajpay et al. |

* cited by examiner

METHOD AND APPARATUS FOR PROVIDING AUTOMATED PROCESSING OF A SWITCHED VOICE SERVICE ALARM

This application is a continuation of U.S. patent application Ser. No. 12/175,174, filed Jul. 17, 2008, now U.S. Pat. No. 8,363,790, and is herein incorporated by reference in its entirety.

The present invention relates generally to communication networks and, more particularly, to a method and apparatus for providing automated processing of switched voice service alarms on a switched and/or Internet Protocol (IP) network.

BACKGROUND OF THE INVENTION

A customer may subscribe to a switched voice service that includes one or more of a Plain Old Telephone Service (POTS), a digital link service and/or an Outward Wide Area Telecommunications Service (OUTWATS). When a service failure or degradation occurs, it may be detected by the network service provider or reported by a customer to the network service provider. For example, if a customer detects a failure on his/her switched voice service, the customer may report the failure to the network service provider. The network service provider may then dispatch maintenance personnel to perform trouble isolation and repair. However, in a large network, the cost of dispatching personnel for each detected and/or reported problem is very high. In addition, the customer may be receiving a degraded service or no service at all while alarms are being generated. The degraded service and the delay in performing maintenance affect customer satisfaction.

SUMMARY OF THE INVENTION

In one embodiment, the present invention discloses a method and apparatus for providing automatic processing of alarms on a switched and/or Internet Protocol (IP) network. For example, the method receives an alarm associated with a switched voice service, and retrieves a Local Routing Number (LRN) or Primary Inter-exchange Carrier (PIC) information from a switch serving a call associated with a caller's telephone number. The method determines if the alarm is due to one or more service degradations, and notifies a work center responsible for one or more of the service degradations if the alarm is due to the one or more service degradations.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
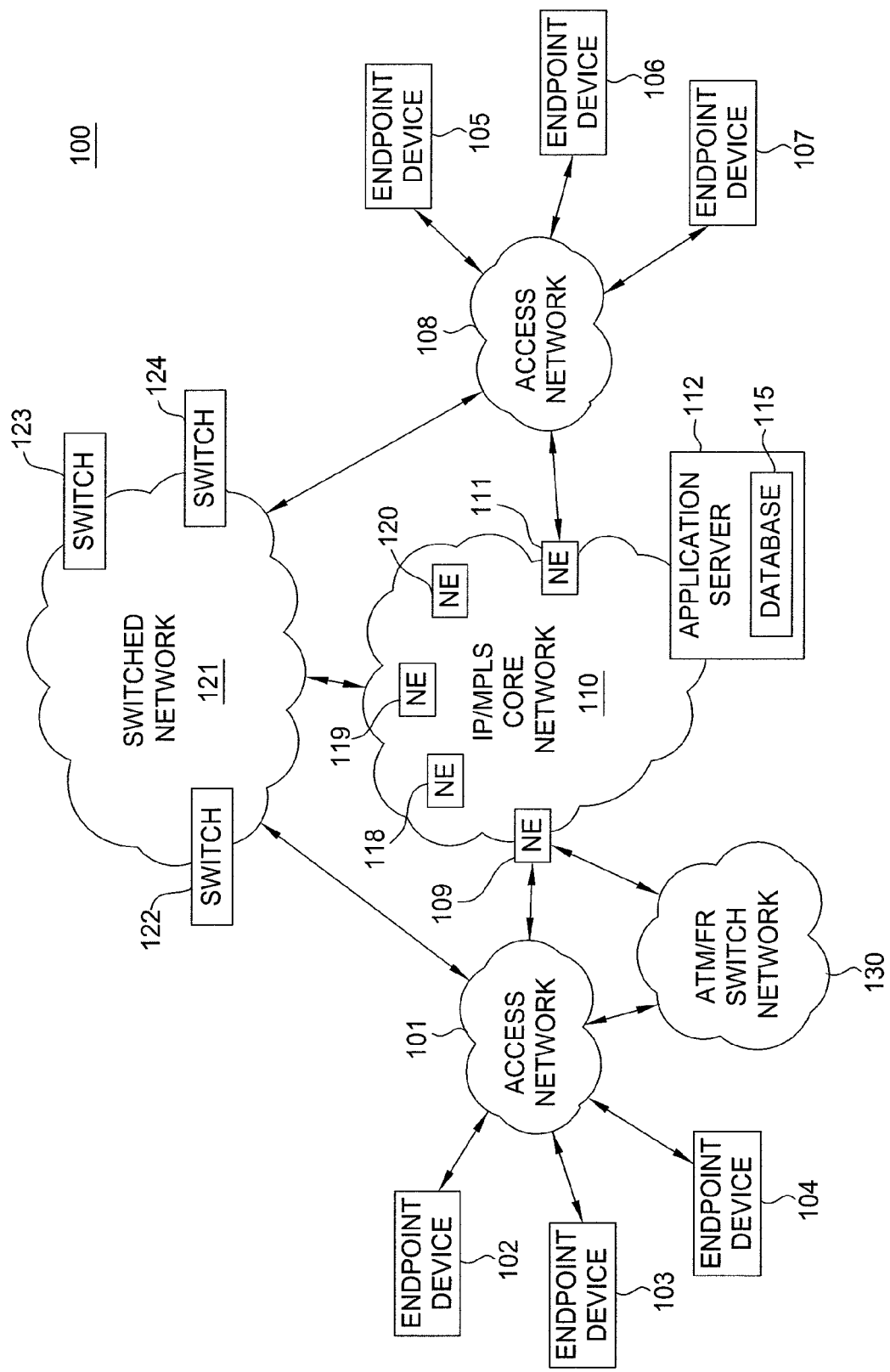
FIG. 1 illustrates an exemplary network related to the present invention.

The present invention broadly discloses a method and apparatus for providing automated processing of a switched voice alarm on a switched and/or Internet Protocol (IP) network. FIG. 1 is a block diagram depicting an exemplary network 100 related to the current invention. Exemplary networks include switched networks, Internet protocol (IP) networks, Asynchronous Transfer Mode (ATM) networks, frame-relay networks, and the like.

A switched network is broadly defined as a network that creates continuous pathways between callers and called parties by disconnecting and reconnecting lines in various configurations (i.e., by switching). In contrast, ATM, frame-relay and IP networks, etc. are packet based networks. An IP network is broadly defined as a network that uses Internet Protocol such as IPv4 or IPv6 and the like to exchange data packets.

In one embodiment, the network 100 may comprise a plurality of endpoint devices 102-104 configured for communication with the core packet network 110 (e.g., an IP based core backbone network supported by a service provider) or the switched network 121. The endpoint devices 102-104 may communicate with the switched network 121 and/or the IP/MPLS core network 110 via an access network 101. Similarly, a plurality of endpoint devices 105-107 are configured for communication with the core packet network 110 and/or the switched network 121 via an access network 108. The switched network 121 and the IP/MPLS core network 110 are connected to enable calls to originate in either network and to complete in either network seamlessly. For example, a Gigabit switched router in the IP network may be connected to an edge switch in the switched network.

The network elements 109 and 111 may serve as gateway servers or edge routers for the IP/MPLS core network 110. Switches 122-124 may serve as switches or edge switches for the switched network 121.

The endpoint devices 102-107 may comprise customer endpoint devices such as personal computers, laptop computers, Personal Digital Assistants (PDAs), servers, routers, and the like. The access networks 101 and 108 serve as a means to establish a connection between the endpoint devices 102-107 and one or more of the NEs 109 and 111, and the switches 122-124. The access networks 101 and 108 may each comprise a Digital Subscriber Line (DSL) network, a broadband cable access network, a Local Area Network (LAN), a Wireless Access Network (WAN), a 3$^{rd}$ party network, and the like.

The access networks 101 and 108 may be either directly connected to NEs 109 and 111 of the IP/MPLS core network 110 or through an Asynchronous Transfer Mode (ATM) and/or Frame Relay (FR) switch network 130. If the connection to the IP/MPLS core network 110 is through the ATM/FR network 130, the packets from customer endpoint devices 102-104 (traveling towards the IP/MPLS core network 110) traverse the access network 101 and the ATM/FR switch network 130 and reach the border element 109.

The ATM/FR network 130 contains Layer 2 switches functioning as Provider Edge Routers (PER) and/or Provider Routers (PR). The PERs may also contain an additional Route Processing Module (RPM) that converts Layer 2 frames to Layer 3 Internet Protocol (IP) frames. An RPM enables the transfer of packets from a Layer 2 Permanent Virtual Connection (PVC) circuit to an IP network which is connectionless.

Some NEs (e.g., NEs 109 and 111) reside at the edge of the IP/MPLS core infrastructure and interface with customer endpoints over various types of access networks. An NE that resides at the edge of a core infrastructure is typically implemented as an edge router, a media gateway, a border element, a firewall, a switch, and the like. An NE may also reside within the IP network (e.g., NEs 118-120) and may be used as a mail server, honeypot, a router, or like device. The IP/MPLS core network 110 also comprises an application server 112 that contains a database 115. The application server 112 may comprise any server or computer that is well known in the art, and the database 115 may be any type of electronic collection of data that is also well known in the art. Those skilled in the art will realize that although only six endpoint devices, two access networks, five network elements, one application server and so on are depicted in FIG. 1, the communication system 100 may be expanded by including additional endpoint devices, access networks, network elements, application servers, 3$^{rd}$ party networks, etc. without altering the present invention.

The above IP network is described to provide an illustrative environment in which packets for voice and data services are transmitted on switched and/or IP networks. A customer may subscribe to a switched voice service that includes one or more of a Plain Old Telephone Service (POTS), a digital link service and/or an Outward Wide Area Telecommunications Service (OUTWATS). Broadly, a Switched Voice Service (SVS) supports voice or analog data transmission of provisioned circuit. When a service failure or degradation occurs, it may be detected by the network service provider or reported by a customer to the network service provider. For example, a customer may detect a failure on his/her switched voice service and report the failure to the network service provider. For example, the customer may interact with an Interactive Voice Response (IVR) system and report an outage/degradation for a telephone number.

In one embodiment, the present invention discloses a method and apparatus for providing automatic processing of switched voice alarms on a network. In order to clearly describe the current invention, the following networking terminologies and concepts are first provided:

A switched network;
A class-4 central office;
A class-5 central office;
Class-4 Electronic Switching System (4ESS);
Class-5 Electronic Switching System (5ESS); and
Wide Area Telephone Service (WATS).

A switched network refers to a network that interconnects class 4 and class 5 central offices as described below. The switching is accomplished by disconnecting and reconnecting lines in different configurations to enable a continuous pathway to be set up between a sender and a recipient.

A class-4 central office refers to a switching center for toll calls. A class 4 office, switches toll traffic originating at class 5 offices to other class 4 offices, or to offices of a higher class. A class 4 office also relays toll traffic from a class 4 toll office, to a class 5 office serving a destination address.

A class-5 central office refers to the lowest level in a hierarchy of central offices. A class 5 office serves as a network entry point for customer access lines. Class 5 central offices are also switching centers for local calls.

Class-4 Electronic Switching System (4ESS) refers to a switch used mainly in class 4 offices.

Class-5 Electronic Switching System (5ESS) refers to a switch used in class 5 offices, and sometimes in offices too small for class 4 switches.

Wide Area Telephone Service (WATS) refers to a telecommunication service that allows subscribers to make outgoing (OUTWATS) or incoming (INWATS) voice or data calls and be billed on a bulk rate bases as opposed to being billed for each incoming or outgoing long distance call. INWATS is a toll-free dialing service and OUTWATS is a bulk savings on long-distance dialing costs for subscribers. These two services can be provided by special access lines connected at a WATS service provider. A single access line for a WATS service handles either INWATS or OUTWATS, but not both. For example, large companies use OUTWATS to receive bulk-rate discounts. Since the OUTWATS telephone number cannot have incoming calls, the phone number is usually in the format of: (800) XXX-XXXX and the like.

Figure 2:
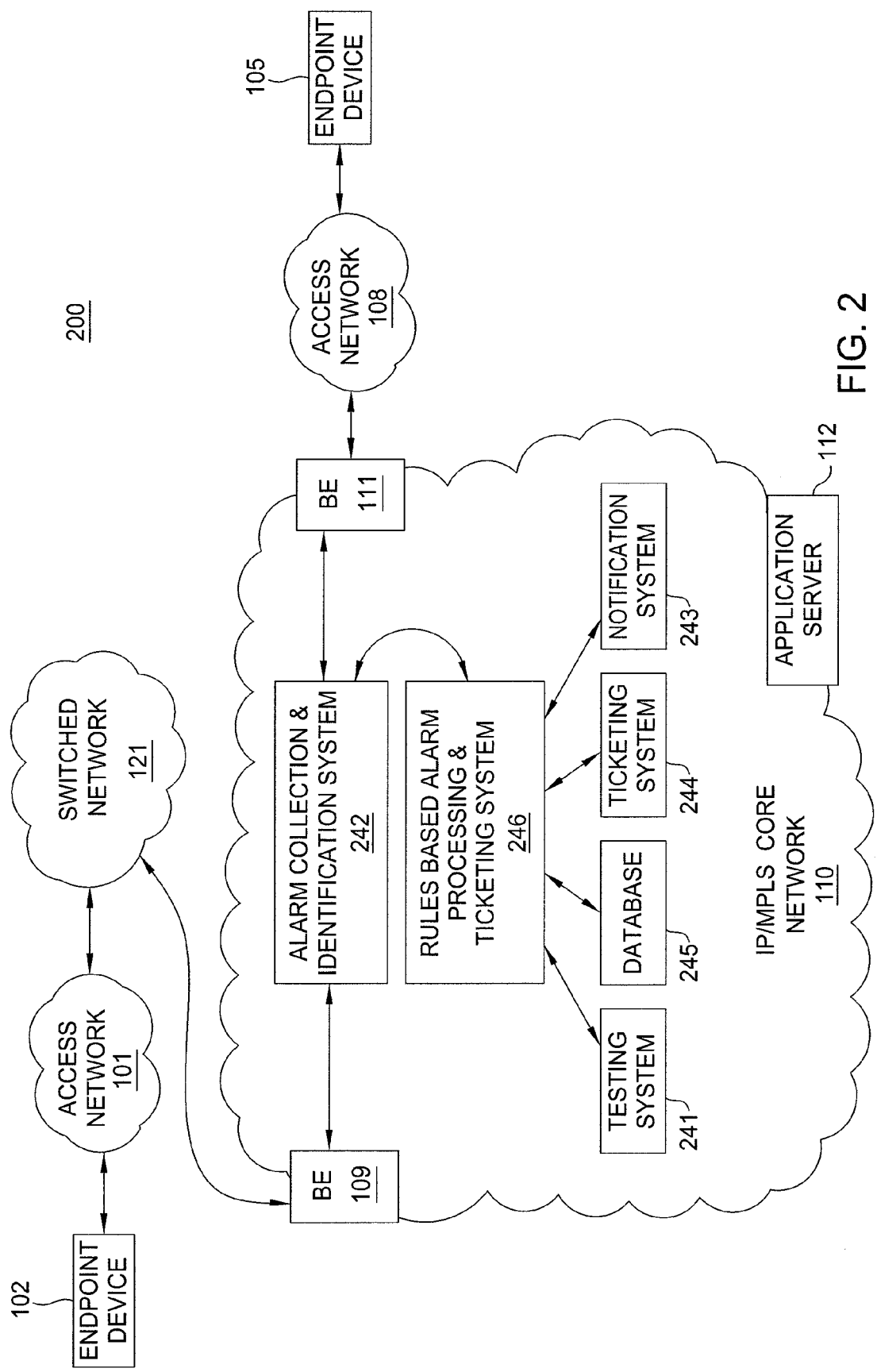
FIG. 2 illustrates an exemplary network with automated processing of a switched voice alarm.

FIG. 2 illustrates an exemplary network 200 with automated processing of a switched voice alarm. For example, a customer endpoint device 102 is communicating with a switched network 121 via an access network 101. A customer endpoint device 105 is communicating with an IP/MPLS core network 110 via an access network 108.

In one embodiment, the IP/MPLS core network 110 comprises an application server 112, border elements 109 and 111, a testing system 241, an alarm collection and identification system 242, a notification system 243, a ticket generation system 244, a database of record 245, and a rule based alarm processing and ticketing system 246.

Border elements 109 and 111 function as PE routers for the IP/MPLS core network 110. The rule based alarm processing and ticketing system 246 is connected to the various systems 241-245 for automating processing of network alarms. The application server 112 enables customers to subscribe to services with automated processing of network alarms.

In one embodiment, the testing system 241 is used for sending test packets and receiving responses. For example, the testing system 241 may send "ping" signal to ports on switches, get snapshots of various counters in routers and switches, and so on.

In one embodiment, the ticket generation system 244 is accessible by customers and service provider personnel. For example, a customer or work center personnel may interact with an Interactive Voice Response (IVR) system and generate a ticket. The ticket may also be created by automatically detected alarms by alarm collection and identification system 242. The alarm collection and identification system 242 is connected to PE routers 109 and 111. Similarly, the notification system 243 may be used to provide one or more notifications to a customer, or one or more work centers.

For example, the customer with an endpoint device 102 may initiate a call towards the customer with an endpoint device 105. That is, the caller subscribes to a service from the switched network, e.g., Plain Old Telephone Service (POTS), while the called party (destination number) subscribes to services from the IP/MPLS network, e.g., Voice over Internet Protocol (VoIP) service.

In one embodiment, the current invention provides automatic processing of switched voice service alarms. In one example, a customer reports trouble to a switched voice service provider via an IVR system. For example, a customer may report trouble for a telephone number, e.g., reporting a degradation or a failure associated with the customer's telephone number (area code) xxx-xxxx. In one embodiment, the report/alarm may be forwarded to the service provider's rule based alarm processing and ticketing system 246.

The rule based alarm processing and ticketing system 246 may then query the database of record 245 to identify the switch serving the calling number. For example, the method may use the calling telephone number to identify the "original" switch serving the caller.

The method may then request the Local Routing Number (LRN) or Primary Inter-exchange Carrier (PIC) information from the original switch serving the caller. PIC refers to the long distance company that is automatically accessed when a customer dials 1+telephone number. For example, the method may run a command, e.g., M73 command on 4ESS switches, to retrieve the LRN or PIC.

The method then determines whether or not an LRN is received. If an LRN is received, the method queries the database of record using the LRN information. Otherwise, PIC is received and the method identifies the long distance company that is automatically accessed when the customer dials 1+telephone number. The method then checks for the presence of any received trouble codes.

If a trouble code indicates one or more of: a cut-off condition, a noise condition, a static condition, a crosstalk condition, a low volume condition, or an echo condition, then the service is degraded. If one or more troubles for service degradation are indicated, the method determines the responsible work center and refers the trouble to the responsible work center.

In one embodiment, the responsible work center and the action to be taken are determined based on the LRN and/or PIC. Table-1 provides an example for using the LRN and/or PIC for handling degradation troubles.

TABLE 1

An example for using the LRN and/or PIC for forwarding degradation troubles to work centers.

| Received from switch | Description of LRN or PIC received form switch | Action(s) |
| --- | --- | --- |
| LRN | LRN representing a digital link service | Notify customer that he/she has a digital link service and has the circuit ID. The customer needs to report the trouble on the circuit ID. Auto close current ticket. |
| | LRN not representing a digital link service | Notify work center to do a test call. Refer the ticket to the access provider if the test call identifies no trouble. Perform diagnosis if the test call identifies trouble. |
| PIC | PIC is that of the service provider | Refer trouble ticket to access provider such that the access provider performs a test call on the calling to number, i.e. the destination number. |
| | PIC is not that of said service provider, e.g. PIC is for another service provider. | Notify customer to contact the access provider and request the PIC to be changed to that of the service provider. Auto close ticket. |

If no trouble code for service degradation is indicated, then the method proceeds to determining whether or not the trouble is due to a provisioning error. In one example, a provisioning error may occur due to a discrepancy between the service that the customer expects to receive and the service that is actually being provided. In another example, the provisioning error may be due to an error in configuring the customer's service.

In order to determine whether or not the trouble is due do a provisioning error, the method first queries the database for Automatic Number Identification (ANI) and Number Plan Type (NPT). The response may include either a valid plain old telephone number or a local routing number.

If a local routing number is received, the method notifies the work center of ANI discrepancy or configuration problem. If a telephone number and an NPT of a plain old telephone number are received, the method proceeds to perform an analysis based on ANI and/or location type (LOCN). The received ANI may be for one of the illustrative services provided below:

A switched digital data only service;
A switched digital data and voice service;
A dedicated Software Defined Network (SDN) service on a class 4 switch; or
A dedicated Software Defined Network (SDN) service on a class 5 switch.

If the received ANI is for a switched digital data only service, the method first verifies the customer name (e.g., customer name abbreviation or any other customer identification) and/or customer number in the database. If the customer name and customer number are consistent with that of a switched digital data service, the method notifies the work center that the provisioned ANI is that of a switched digital data service. The work center may then verify whether or not the customer is using the line for both data and voice calls.

If the received ANI is for a switched digital data and voice service, the method then verifies the customer name, network abbreviation, and location (LOCN) type in the database. The LOCN may be MAIN (customer connected to service provider via T1 access), MULT (customer has multiple numbers terminating at a T1 access), ORG (customer site has T1 access and it is used only for originating calls), SWAC (switched access), VON (virtual on net), or other. If the LOCN type is other than MAIN, MULT, ORG, SWAC, or VON, the method proceeds to performing tests for calling to a number.

If the location type is MAIN, MULT, or ORG, the customer has nodal service and therefore has circuit ID information. The method notifies the customer to report trouble on the circuit ID and automatically closes the current ticket.

If the location type is SWAC or VON, the method proceeds to determining whether or not the service is provided by an SDN (Software Defined virtual private Network) reseller. If the service is provided by an SDN reseller, the method proceeds to performing test for calling to a number (destination). If the service is not provided by an SDN reseller, the method proceeds to check whether or not the calling from a number has an area code from a restricted area, e.g., Hawaii or Puerto Rico. If it is from a restricted area, the method proceeds to performing the test for calling to a number. If it is not from a restricted area, the method verifies whether or not the network flag is set such that the ANI is dedicated, originates from a class 4 switch, and is defined to accept traffic from the same POTS ANI. If the flag is not set correctly, the method notifies the work center to change the flag. If the flag is correct, the method proceeds to performing a test for calling to a number.

If the received ANI is for a dedicated Software Defined Network (SDN) service on a class 4 switch, the method verifies the customer name, network abbreviation, and location (LOCN) type. If the location type is MAIN, MULT, ORG, SWAG or VON, the method notifies the work center to change the ANI to that of the switched digital data and voice service. If the location type is not MAIN, MULT, ORG, SWAG or VON, the method proceeds to performing the test for calling to a number.

If the received ANI is for a dedicated SDN service on a class 5 switch, the method verifies the customer name, network abbreviation, and location (LOCN) type. If the location type is MAIN, MULT, or ORG, the method notifies work center to change ANI type to that of switched digital data and voice service. If location type is SWAC or VON, the method then checks whether or not the network flag is set for a nodal class 5 switch, or a dedicated originating from a class 4 switch defined to accept traffic from the same POTS ANI. If the network flag is set to any other type, the method notifies the work center to change the ANI type and re-provision. If the network flag is set correctly, the method proceeds to performing the test for calling to a number. If the location type is not MAIN, MULT, ORG, SWAC or VON, the method proceeds to performing the test for calling to a number.

If the trouble is not diagnosed successfully by analyzing the ANI, LOCN, etc. of the calling number (source), the method proceeds to performing the test for calling to a number (destination). The method first retrieves the called number from the database containing Call Detail Records (CDR). The method then determines whether or not the called number is an IP telephone number.

If the called number is not an IP telephone number, the method determines whether or not the called number is an 8YY-xxx-xxxx number (e.g., a toll free number) (WATS). If the called number is not an 8YY number, the method determines the dialing capabilities of the ANI. For example, blockage may be in place.

If the called number is an 8YY number, the method performs a test call from the home switch. If the test call identifies no trouble, the method automatically closes the ticket and notifies the customer to check for trouble in the customer premise equipment. If the test call identifies trouble, the method notifies the customer to report trouble to the access provider for the 8YY service and automatically closes the current ticket.

If the called number is an IP telephone number, the method retrieves the IP address, router information, etc. from a database. The method then checks the status of the IP ports, e.g. whether or not the link and protocol are active. For example, the method may run a "show interface" command to ports on routers and determine whether or not the links and protocols are active.

If the link or protocol is not active, the method proceeds to verify the network configuration. For example, the method may run a show interface command to determine the network configurations. If the customer's virtual route forwarding table and provider edge router IP address match those in the database, the method notifies the work center to create a trouble ticket on the IP network. If the customer's VRF and PER IP address do not match those in the database, the method notifies the work center of a possible configuration problem.

If the link and protocol are active, the method may determine the status of the customer router, e.g., by sending a "ping" command to the customer router. If a successful response is not received from the customer router, the method then proceeds to verify the network configuration as described above. If the customer router responds successfully, the method determines the status of the edge router that connects the class 5 switch to the IP network. For example, the method may ping the edge router. If the status of the edge router identifies no trouble, the method notifies the customer to check the status of the customer premise equipment and automatically closes the current ticket. If the status of the edge router identifies a network trouble, the method notifies the work center such that remedial steps may begin.

Figure 3A:
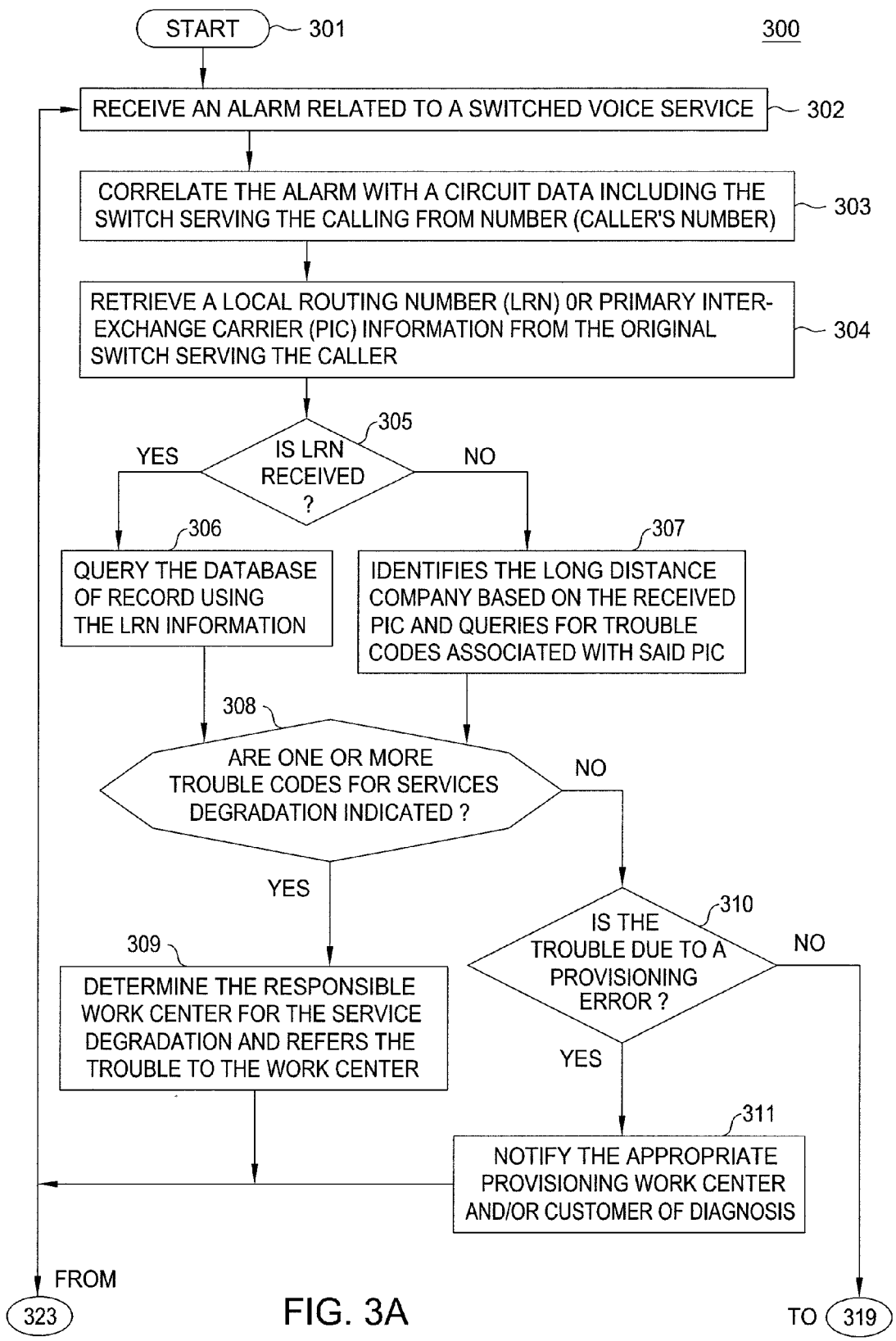
FIGS. 3A-3C collectively illustrate a flowchart of a method for providing automated processing of a switched voice alarm.
Figure 3B:
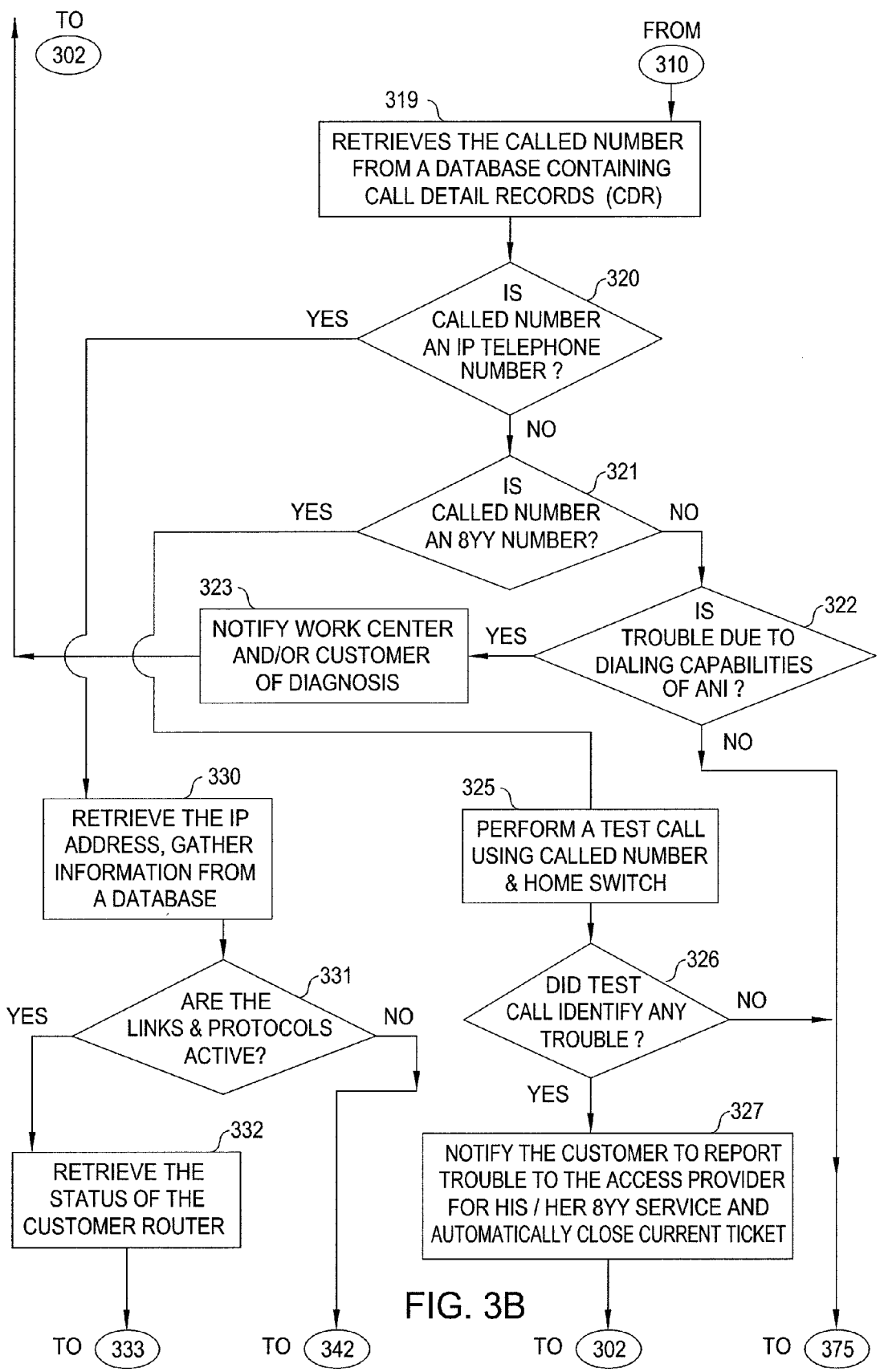
Figure 3C:
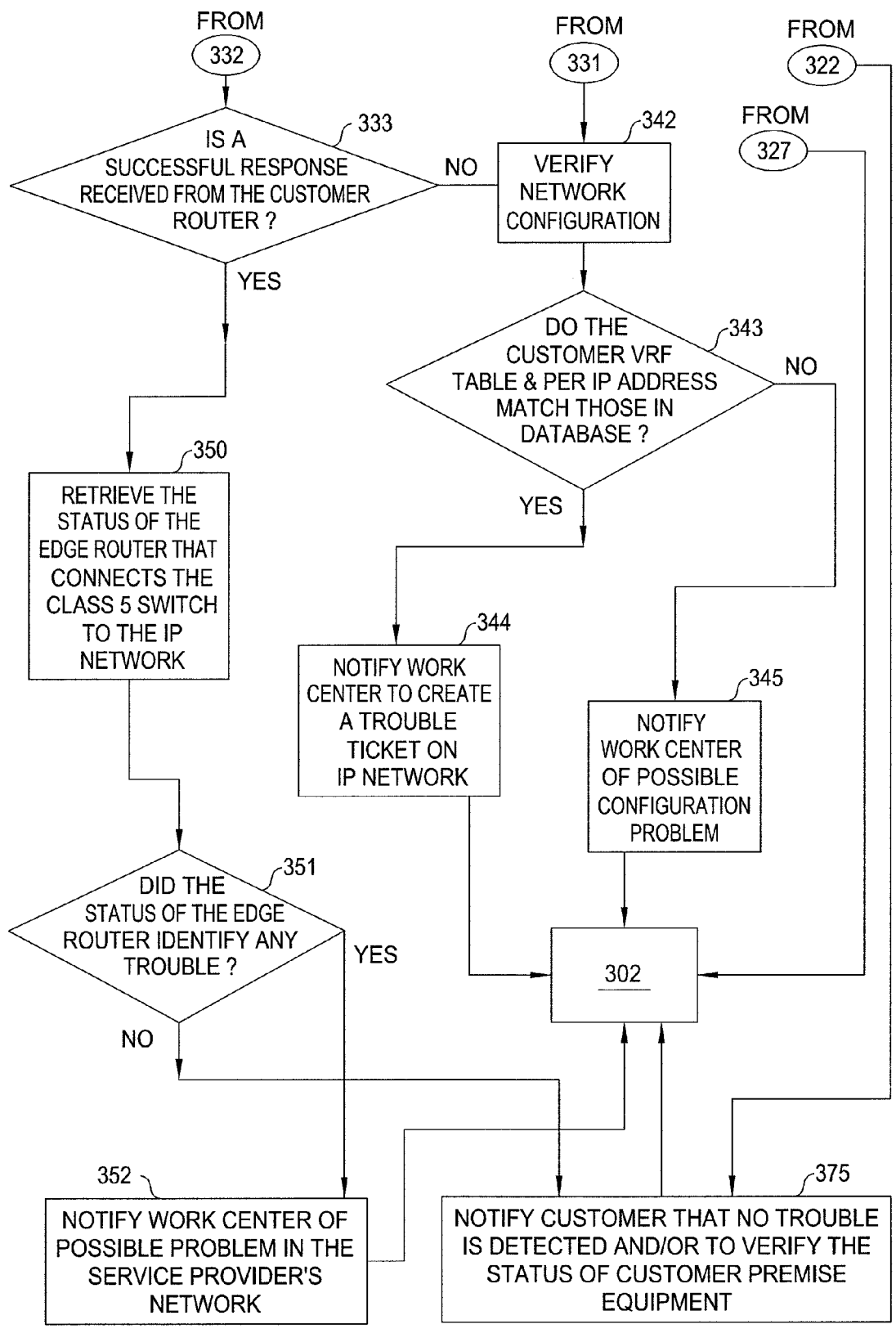

FIG. 3 illustrates a flowchart of a method 300 for providing automatic processing of a switched voice alarm. For example, method 300 or portion of method 300 can be implemented by the rules based alarm processing and ticketing system 246. Method 300 starts in step 301 and proceeds to step 302.

In step 302, method 300 receives an alarm related to a switched voice service. For example, a rule based alarm processing and ticketing system receives an alarm for a telephone number assigned to a switched voice service customer.

In step 303, method 300 correlates the alarm with a circuit data including the switch serving the calling from number (caller's number). For example, the rule based alarm processing and ticketing system may access a database of record, and identify the switch serving the calling from number. For example, the method may use the calling from telephone number to identify the original switch serving the caller.

In step 304, method 300 retrieves a Local Routing Number (LRN) or Primary Inter-exchange Carrier (PIC) information from said original switch serving the caller. For example, the method may run a command, e.g., a M73 command on class 4 switches, to retrieve the LRN or PIC.

In step 305, method 300 determines whether or not an LRN is received. If an LRN is received, the method proceeds to step 306. Otherwise, a PIC is received and the method proceeds to step 307.

In step 306, the method queries the database of record using the LRN information. For example, the method queries the database of record to gather trouble information for the LRN. The method then proceeds to step 308.

In step 307, the method identifies the long distance company based on the received PIC and queries for trouble codes associated with the PIC. The method then proceeds to step 308.

In step 308, method 300 determines whether or not one or more trouble codes for service degradation are indicated. In one embodiment, a trouble code for a service degradation may comprise one or more of: a cutoff condition, a noise condition, a static condition, a crosstalk condition, a low volume condition, or an echo condition. If one or more troubles for service degradation are indicated, the method proceeds to step 309. Otherwise, the method proceeds to step 310.

In step 309, method 300 determines the responsible work center for the service degradation and refers the trouble to the work center. The responsible work center and the action to be taken are determined based on the LRN and/or PIC. For example, using Table-1 as described above. The method then proceeds to step 302.

In step 310, method 300 determines whether or not the trouble is due to a provisioning error. In one example, a provisioning error may occur due to a discrepancy between the service that the customer expects to receive and the service that is actually being provided to the customer. In another example, the provisioning error is due to an error in configuring the customer's service. In another example, the customer may be using a data only connection for a voice call. In another example, the customer may have a nodal service and is inappropriately reporting trouble on a telephone number instead of a circuit ID. In another example, the service may be blocked from being used outside of a specific region, e.g., main land USA. If the trouble is due to a provisioning error, the method proceeds to step 311. Otherwise, the method proceeds to step 319 to determine whether or not the trouble is due to a problem associated with the called number (destination).

In step 311, method 300 notifies the appropriate provisioning work center and/or customer of diagnosis. The method then proceeds to step 302.

In step 319, method 300 retrieves the called number from a database containing Call Detail Records (CDR). The method then proceeds to step 320.

In step 320, method 300 determines whether or not the called number is an IP telephone number. If the called number is an IP telephone number, the method proceeds to step 330. Otherwise, the method proceeds to step 321.

In step 321, method 300 determines whether or not the called number is an 8YY-xxx-xxxx number (e.g., a WATS number). If the called number is not an 8YY number, the method proceeds to step 322. Otherwise, the method proceeds to step 325.

In step 322, method 300 determines whether or not the trouble is due to the dialing capabilities of the ANI. For example, a blockage may be in place. If trouble is due to the dialing capabilities, the method proceeds to step 323. Otherwise, the method proceeds to step 375.

In step 323, method 300 notifies the appropriate work center and/or customer of the diagnosis. For example, the method may determine that a blockage is placed by the service provider for certain area code, region, etc. The method then proceeds to step 302.

In step 325, method 300 performs a test call using the called number and home or original switch. For example, the method performs a POTS call. The method then proceeds to step 326.

In step 326, method 300 determines whether or not the test call identified any trouble. If the method identified no trouble, the method proceeds to step 375. Otherwise, the method proceeds to step 327.

In step 327, method 300 notifies the customer to report trouble to the access provider for his/her 8YY service and automatically closes the current ticket. The method then proceeds to step 302.

In step 330, method 300 retrieves the IP address and router information from a database. For example, the called party may subscribe to a Voice over Internet Protocol (VoIP) service. The method then retrieves the IP address, router information, and any relevant information associated with the VoIP service. The method then proceeds to step 331.

In step 331, method 300 retrieves the status of IP ports and determines whether or not the links and protocols are active. For example, the method may run a "show interface" command to ports on the routers to obtain port and protocol status. If the links and protocols are not active, the method proceeds to step 342. Otherwise, the method proceeds to step 332.

In step 332, method 300 retrieves the status of the customer router, e.g., by sending a ping command to the customer router from the provider edge router. The method then proceeds to step 333.

In step 333, method 300 determines whether or not a successful response is received from the customer router. If a successful response is received from the customer router, the method proceeds to step 350. Otherwise, the method proceeds to step 342 to verify network configuration.

In step 342, method 300 verifies the network configuration. For example, the method may run a show interface command to determine the network configurations. The method then proceeds to step 343.

In step 343, method 300 determines whether or not the customer's Virtual Route Forwarding (VRF) table and Provider Edge Router (PER) IP address match those in the database. If the VRF table and PER IP address match those in the database, the method proceeds to step 344. Otherwise, method 300 proceeds to step 345.

In step 344, method 300 notifies the work center to create a trouble ticket on the IP network. The method then proceeds to step 302.

In step 345, method 300 notifies the work center of a possible configuration problem. The method then proceeds to step 302.

In step 350, method 300 retrieves the status of the edge router that connects the class 5 switch to the IP network. For example, the method may ping the edge router. The method then proceeds to step 351.

In step 351, method 300 determines whether or not the status of the edge router identified any trouble. If no trouble is identified, the method proceeds to step 375. Otherwise, the method proceeds to step 352.

In step 352, method 300 notifies the work center of a possible problem in the service provider's network. A work center personnel may then initiate one or more remedial steps. The method then proceeds to step 302.

In step 375, method 300 notifies the customer that no trouble is detected and/or to verify the status of the customer premise equipment. The method then closes the current ticket and proceeds to step 302.

It should be noted that although not specifically specified, one or more steps of method 300 may include a storing, displaying and/or outputting step as required for a particular application. In other words, any data, records, fields, and/or intermediate results discussed in the method 300 can be stored, displayed and/or outputted to another device as required for a particular application. Furthermore, steps or blocks in FIG. 3 that recite a determining operation, or involve a decision, do not necessarily require that both branches of the determining operation be practiced. In other words, one of the branches of the determining operation can be deemed as an optional step.

Figure 4:
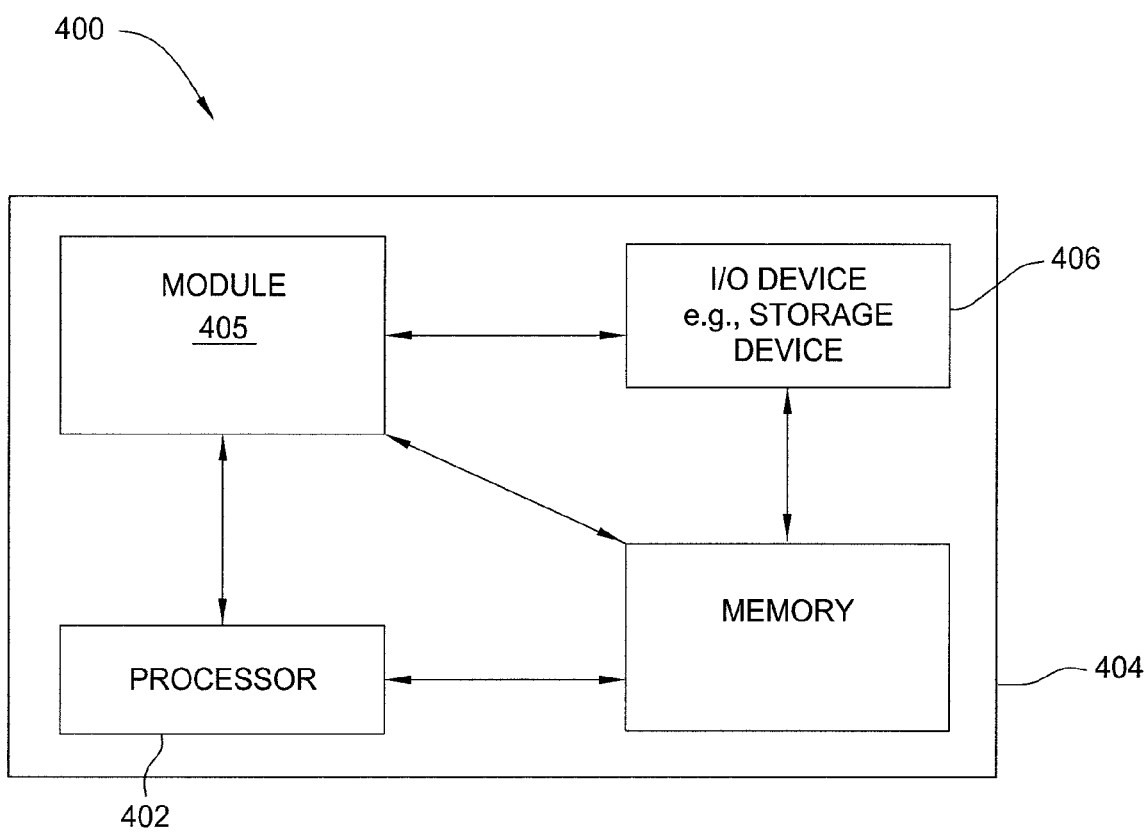
FIG. 4 illustrates a high-level block diagram of a general-purpose computer suitable for use in performing the functions described herein.

FIG. 4 depicts a high-level block diagram of a general-purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for providing automatic processing of a switched voice alarm, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 405 for providing automatic processing of a switched voice alarm can be loaded into memory 404 and executed by processor 402 to implement the functions as discussed above. As such, the present method 405 for providing automatic processing of a switched voice alarm (including associated data structures) of the present invention can be stored on a computer readable medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:
1. A method for processing an alarm, comprising:
receiving, by a processor, the alarm associated with a switched voice service;
retrieving, by the processor, a local routing number or primary inter-exchange carrier information from a switch serving a call associated with a caller's telephone number;
determining, by the processor, whether the alarm is due to a service degradation based on the local routing number or the primary inter-exchange carrier information; and
notifying, by the processor, a work center responsible for the service degradation based on the local routing number or the primary inter-exchange carrier information when the alarm is due to the service degradation.

2. The method of claim 1, further comprising:
determining whether the alarm is due to a provisioning error when the alarm is not due to the service degradation; and
notifying a work center responsible for the provisioning error when the alarm is due to the provisioning error.

3. The method of claim 2, further comprising:
determining whether a called number is an internet protocol network telephone number of an internet protocol network.

4. The method of claim 3, further comprising:
determining whether the called number is a toll free number when the called number is not an internet protocol number.

5. The method of claim 4, further comprising:
determining whether the alarm is due to a toll free service of a customer when the called number is the toll free number; and
notifying the customer of a trouble with the toll free service.

6. The method of claim 4, further comprising:
determining whether the alarm is due to a dialing capability associated with an automatic number identification when the called number is not a toll free number.

7. The method of claim 6, wherein the automatic number identification is associated with at least one of: a switched digital data only service, a switched digital data and voice service, a dedicated software defined network service on a class 4 switch, or a dedicated software defined network service on a class 5 switch.

8. The method of claim 1, wherein the service degradation comprises at least one of: a cut-off condition, a noise condition, a static condition, a crosstalk condition, a low volume condition, or an echo condition.

9. A non-transitory computer-readable medium storing a plurality of instructions which, when executed by a processor, cause the processor to perform operations for processing an alarm, the operations comprising:
receiving the alarm associated with a switched voice service;
retrieving a local routing number or primary inter-exchange carrier information from a switch serving a call associated with a caller's telephone number;
determining whether the alarm is due to a service degradation based on the local routing number or the primary inter-exchange carrier information; and
notifying a work center responsible for the service degradation based on the local routing number or the primary inter-exchange carrier information when the alarm is due to the service degradation.

10. The non-transitory computer-readable medium of claim 9, further comprising:
determining whether the alarm is due to a provisioning error when the alarm is not due to the service degradation; and
notifying a work center responsible for the provisioning error when the alarm is due to the provisioning error.

11. The non-transitory computer-readable medium of claim 10, further comprising:
determining whether a called number is an internet protocol network telephone number of an internet protocol network.

12. The non-transitory computer-readable medium of claim 11, further comprising:
determining whether the called number is a toll free number when the called number is not an internet protocol number.

13. The non-transitory computer-readable medium of claim 12, further comprising:
determining whether the alarm is due to a toll free service of a customer when the called number is the toll free number; and
notifying the customer of a trouble with the toll free service.

14. The non-transitory computer-readable medium of claim 12, further comprising:
determining whether the alarm is due to a dialing capability associated with an automatic number identification when the called number is not a toll free number.

15. The non-transitory computer-readable medium of claim 14, wherein the automatic number identification is associated with at least one of: a switched digital data only service, a switched digital data and voice service, a dedicated software defined network service on a class 4 switch, or a dedicated software defined network service on a class 5 switch.

16. The non-transitory computer-readable medium of claim 9, wherein the service degradation comprises at least one of: a cut-off condition, a noise condition, a static condition, a crosstalk condition, a low volume condition, or an echo condition.

17. An apparatus for processing an alarm, comprising:
a processor; and
a computer-readable medium storing a plurality of instructions which, when executed by the processor, cause the processor to perform operations, the operations comprising:
receiving the alarm associated with a switched voice service;
retrieving a local routing number or primary inter-exchange carrier information from a switch serving a call associated with a caller's telephone number;
determining whether the alarm is due to a service degradation based on the local routing number or the primary inter-exchange carrier information; and
notifying a work center responsible for the service degradation based on the local routing number or the primary inter-exchange carrier information when the alarm is due to the service degradation.

18. The apparatus of claim 17, further comprising:
determining whether the alarm is due to a provisioning error when the alarm is not due to the service degradation; and
notifying a work center responsible for the provisioning error when the alarm is due to the provisioning error.

19. The apparatus of claim 18, further comprising:
determining whether a called number is an Internet protocol network telephone number of an internet protocol network.

20. The apparatus of claim 19, further comprising:
determining whether the called number is a toll free number when the called number is not an internet protocol number.

* * * * *